(12) United States Patent
Kashyap et al.

(10) Patent No.: US 11,627,117 B2
(45) Date of Patent: Apr. 11, 2023

(54) SECURE SEARCH SERVICE

(71) Applicant: Fortanix, Inc., Mountain View, CA (US)

(72) Inventors: Anand Kashyap, Los Altos, CA (US); Ambuj Kumar, Sunnyvale, CA (US); Nehal Bandi, San Jose, CA (US)

(73) Assignee: Fortanix, Inc., Mountain View, CA (US)

( * ) Notice: Subject to any disclaimer, the term of this patent is extended or adjusted under 35 U.S.C. 154(b) by 325 days.

(21) Appl. No.: 16/996,691

(22) Filed: Aug. 18, 2020

(65) Prior Publication Data
US 2022/0060451 A1 Feb. 24, 2022

(51) Int. Cl.
*H04L 9/40* (2022.01)
*G06F 16/245* (2019.01)
*G06F 21/60* (2013.01)
*G06F 16/953* (2019.01)
*H04L 9/08* (2006.01)
*G06F 16/22* (2019.01)

(52) U.S. Cl.
CPC .......... *H04L 63/0428* (2013.01); *G06F 16/22* (2019.01); *G06F 16/245* (2019.01); *G06F 16/953* (2019.01); *G06F 21/602* (2013.01); *H04L 9/0819* (2013.01); *H04L 63/166* (2013.01)

(58) Field of Classification Search
CPC . H04L 63/0428; H04L 9/0819; H04L 63/166; H04L 9/0897; H04L 9/3234; H04L 63/062; G06F 16/22; G06F 16/245; G06F 16/953; G06F 21/602; G06F 21/606
See application file for complete search history.

(56) References Cited

U.S. PATENT DOCUMENTS

| 10,764,244 B1* | 9/2020 | Mestery ............ H04L 61/2592 |
| 11,314,743 B1* | 4/2022 | Baptist ............... G06F 16/2456 |
| 2009/0186700 A1* | 7/2009 | Konkle ............... G06Q 10/10 463/42 |
| 2020/0358802 A1* | 11/2020 | Viswambharan ..... G06F 9/5072 |

\* cited by examiner

*Primary Examiner* — Abiy Getachew
(74) *Attorney, Agent, or Firm* — Lowenstein Sandler LLP

(57) ABSTRACT

An encrypted search query may be received from a requesting client system at a secure enclave of a processing device. The encrypted search query may be decrypted to form a decrypted search query. One or more index entries of a metadata index that correspond to the decrypted search query may be identified, such that each identified index entry is associated with a content reference that identifies a content item located outside the secure enclave. The index entries that correspond to the decrypted search query may include one or more index entries having one or more associated index metadata items that correspond to the decrypted search query. One or more secure search results may be generated, such that each secure search result corresponds to one of the index entries and comprises the content reference associated with the corresponding index entry. The secure search results may be sent to the requesting client system.

17 Claims, 9 Drawing Sheets

SECURE SEARCH SERVICE

TECHNICAL FIELD

Aspects of the present disclosure relate generally to security, and more specifically, relate to secure search services.

BACKGROUND

A search engine may search a corpus of data, such as the World Wide Web, for content that matches a specified query. The searched content may include content items such as text documents, images, video, and other types of media. The query may be a word or phrase of text, and the search engine may identify the content items in the corpus that contain the word or phrase. In response to a query, the search engine may provide links, which may be Uniform Resource Locators (URLs) or the like, that specify locations from which the identified content items may be retrieved. The search engine may be used to search image data, such as photos taken in particular locations in the real world and uploaded to the World Wide Web, or photos taken by satellites and uploaded to specialized imagery databases. The search engine may store information received with queries, that can be used to identify information about the person submitting the query, such as the Internet address of a device from which a person submits a search query, the geographical location of the submitting device, and so on.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
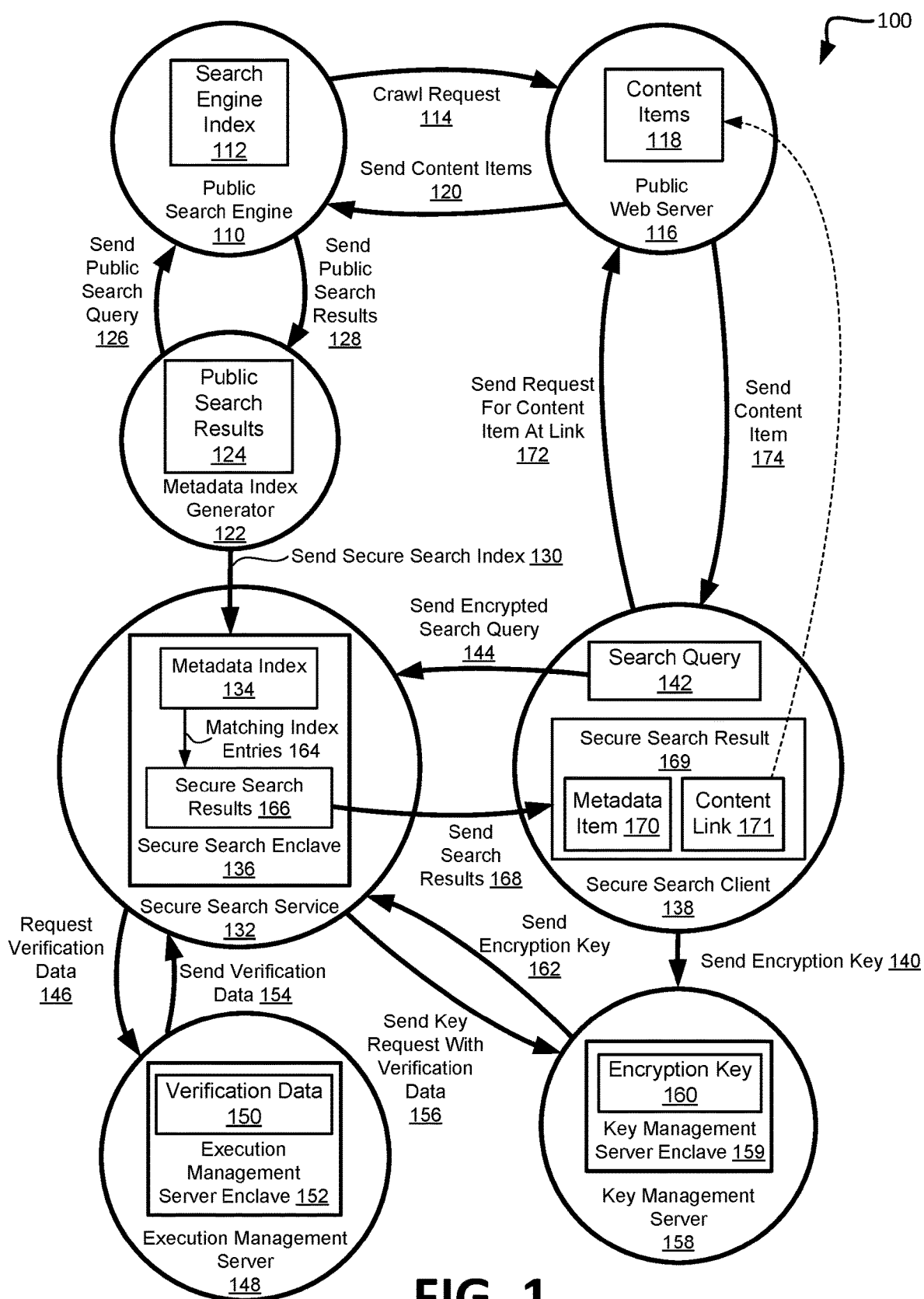
FIG. 1 illustrates an example environment to provide a secure search service in accordance with particular embodiments of the present disclosure.

Aspects of the present disclosure relate to a secure search service that can perform confidential searches in a secure environment of information received from a public search engine. The secure search service may provide data confidentiality and integrity for searches performed in the secure environment using information, such as an index, that is generated based on search results provided by a public search engine. In general, searches using public search engines may reveal sensitive information that is not to be accessible to unauthorized users or systems. The sensitive information may include the identity of the user or organization performing the search, the search queries used in the search, the time and data at which the search is performed, the set of search results, and other information associated with the search.

As an example, an analyst who works for a security agency may wish to search the public Internet for satellite images of a particular geographic region. The query may be sensitive because of the identity of the security agency being associated with the search, and also because of the query itself, if, for example, the query specifies latitude and longitude coordinates of a location that may be recognizable as confidential information, especially when used in a search by the security agency. The search results may be sensitive if they contain confidential information. A set of numerous search results, for example, may be used to deduce confidential information such as the query. The security agency may prohibit the analyst from performing this query because the query uses a public search engine, and public search engines do not ordinarily provide a level of data security sufficient to protect the security agency's sensitive information. Although search engines are described as an example, other types of remote services, such as databases that are located outside the security agency's network firewall, or insufficiently-secure services located inside the security agency's firewall, may be vulnerable to attacks that can gain unauthorized access to sensitive information, as described below.

When searching a corpus of information such as the World Wide Web or other publicly-available information, a user may submit a search query to the public search engine via a communication network such as the public Internet. The public search engine may respond to the query with a set of links to content items that match the query. Although a degree of data confidentiality may be provided in such searches by encrypted network communication between the search client and public search engine as provided by protocols such as Transport Layer Security (TLS), the encrypted network communication can be compromised by runtime attacks on the program code that performs the searching, encryption, and communication. For example, a particular operating system may provide unrestricted access to an unauthorized person who sends a particular pattern of data in a request to a public web server on the operating system. Using the unrestricted access, the unauthorized person may modify program code run by the operating system, such as search engine program code, to provide sensitive information to the unauthorized person. Such attacks may be performed by spyware or other malware, for example. Further, the public search engine itself needs access to sensitive information related to the search, such as the search query, to perform the search. The public search engine is ordinarily provided by a separate entity from the user or organization performing the search, and the public search engine could potentially reveal the sensitive information to unauthorized users or systems.

The vulnerabilities described above, such as runtime attacks or a security breach at a public search engine, may also lead to a loss of data integrity in searches. For example, using the unrestricted access that can be gained by runtime attacks as described above, an unauthorized person may modify search engine program code to perform different operations, e.g., to generate incorrect search results, or perform unauthorized operations using the search results. Such attacks and modification may be performed by ransomware or other malware, for example.

Aspects of the present disclosure address the above and other deficiencies by providing a secure search service that can detect unauthorized access or modification of sensitive information related to searches that may use public search engines. The secure search service may execute in a secure cryptographic environment, such as s secure enclave, which may provide data confidentiality and integrity. As it is impractical to load the entire corpus of content into the secure enclave, a metadata index may be generated for a portion of the corpus, and the metadata index may be loaded into the secure enclave. The metadata index may contain searchable metadata for a portion of the corpus that is expected to be queried by the secure search service, for example. The metadata index may associate particular metadata items (e.g., metadata value) with the links to content items described by the metadata items.

The metadata index may be generated by querying a public search engine to retrieve links and metadata for the portion of the corpus that is expected to be queried by the secure search service. Additional metadata may be generated based on the search results or on other information such as the search query. The metadata may include information associated with each search result, such as description of a geographic location depicted by an image, classifications of objects recognized in an image by an image classifier, the frequency of search terms in a document and a classification of the document identified by a document classifier, and so on.

The search service may receive confidential search queries, which are referred to herein as "secure search queries" to avoid confusion with the public search queries submitted to public search engines. The search service may search the metadata index for metadata that corresponds to (e.g., matches completely or partially) the secure search queries, and provide the link associated with each corresponding to metadata item as a search result. The metadata item associated with each link may also be provided as a search result. The links may be, e.g., URLs, which may be used to access content items, e.g., images or documents. The links provided in the search results may be used to access content on public networks.

Advantages of the present disclosure include, but are not limited to, the ability to perform a secure search of information from public search engines while maintaining confidentiality of sensitive data involved in the search, such as the search query, the identity of the user or organization performing the search query, and the search results. The secure search is performed by searching a metadata index that is stored in a secure cryptographic environment such as a secure enclave. Since the search is performed inside the secure cryptographic environment, and the sensitive data is not sent outside the secure cryptographic environment, the sensitive data is protected from unauthorized access by runtime attacks such as those used by malware or the like.

FIG. 1 illustrates an example environment 100 to provide a secure search service in accordance with particular embodiments of the present disclosure. The environment 100 may correspond to a network cluster that includes nodes on which a metadata index generator 122, a secure search service 132, a secure search client 138, an execution management server 148, and a key management server 158. The network cluster may be a private network cluster of an organization that performs secure searches involving sensitive search-related information that is to be accessed in accordance with access control rules by authorized users, such as employees or other members of the organization. Also shown are a public search engine 110 and a public web server 116, which may be provided by another organization and not subject to the access control rules of the organization that performs the secure searches.

The public search engine 110 may perform searches using an internal search engine index 112. The public search engine 110 may create the search engine index 112 by sending crawl requests 114 to retrieve content items 118 from web servers such as the public web server 116. The public web server 116 may send the requested content items to the public search engine 110 in a response 120, and the web server 116 may update the search engine index 112 based on the received content items. The public search engine 110 may be any suitable type of search engine that processes queries and returns search results based on the queries, such as an Internet search engine that searches public web servers 116, or a search engine for a particular database, such as a satellite image database or a Geographic Information Systems (GIS) database.

The metadata index generator 122 may generate a metadata index to be used by the secure search service 132. The metadata index generator 122 may generate the metadata index based on search results produced by a public search engine 110. The metadata index generator 122 may send a public search query to the public search engine 110 (arrow 126). The public search engine 110 may generate public search results 124 based on the public search query and send the public search results to the metadata index generator 122 (arrow 126). The term "public" is used herein to indicate that the public search engine, public query, and public search results are not necessarily confidential. The term "public" may indicate that at least one unauthorized person or system may access the public search query or public search results 128. Each of the public search results 124 may include metadata information describing a content item 118 that matches the public search query and a link to the matching content item 118. The metadata index generator 122 may generate the metadata index 134 based on the public search results as described below.

As it is impractical to load the entire corpus indexed by the public search engine 110 (e.g., every content item 118 identified by the public search engine 110) into the secure enclave, the metadata index 134 may be generated for a portion of the corpus, and the metadata index 134 may be loaded into a secure search enclave 136 located on a hardware node on which the secure search service 132 is running (e.g., on one or more network servers). The metadata index 134 may contain searchable metadata for a portion of the corpus that is expected to be queried by the secure search service 132, for example.

The public search results 124 to be submitted to the metadata index generator 122 may be generated by the public search engine 110 based on a broad query submitted by the metadata index generator 122. The broad query used for the public search may be broader than expected secure search queries (e.g., secure search queries that are expected to be processed by the secure search service 132). The broad query may cause the public search engine 110 to generate a broad set of search results 124. The broad set of search results 124 may include subsets that can match expected queries. However, the expected queries, as well as the subsets of the search results that match the expected queries, are not ordinarily evident from the broad query and broad search results. Thus, submitting the broad queries to the public search engine 110 does not necessarily make the expected queries publicly available. The metadata index generator 122 may identify metadata associated with each public search result, such as the geographical location, description, or other information provided by the public search engine 110. The metadata index generator 122 may generate an index entry in the metadata index 134 for each public search result, and store the metadata and link associated with the public search result in the index entry of the metadata index 134.

A broad query to be submitted to the public search engine 110 may be generated by removing conditions from expected sensitive queries, or by other techniques based on expected search queries. The broad query may be generated automatically by a query-broadening algorithm. Alternatively or additionally, the broad query may be generated and provided by a human user who may modify one or more expected search queries or generate the broad query based on his or her knowledge of the subject matter of expected search queries. If the sensitive queries are known when the metadata index 134 is generated, the metadata index 134 may be generated by broadening the sensitive queries. If the sensitive queries are not known when the metadata index 134 is generated, then expected sensitive queries may be determined and broadened. Alternatively or additionally, the broad query may be produced manually, e.g., by a user who is familiar with the subject matter of potential future queries. The broad query may be a query that does not contain sensitive information. Since the broad query does not reveal sensitive information, the broad query can be submitted to the public search engine without revealing sensitive information. Further, the public search results 124 produced by the broad query may include numerous results that are not related to sensitive information, and there is no specific distinction in the public search results 124 between the sensitive results and the non-sensitive results.

The metadata index generator 122 may send the generated metadata index to the secure search service 132 (arrow 130). The secure search service 132 may receive and store the metadata index 134 in a secure search enclave 136. The secure search service 132 may then receive an encrypted secure search query 142 from a secure search client 138 (arrow 144).

The secure search service 132 may process the encrypted secure search query 142 by executing program code instructions in the secure search enclave 136 to decrypt the secure search query 142, search the metadata index 134, and generate secure search results 166. The data accessed and generated by the secure search service may also be stored in the secure enclave. The secure search enclave 136 may protect the data and program code instructions stored therein from unauthorized access, and may provide protection against runtime attacks and other security vulnerabilities. Sensitive information related to the query 142, such as the query itself, the association between the query and the searcher (e.g., searching user, organization, or the like), and the time of the search may be stored in the secure search enclave 136. The secure search results 166 may be presented to the searching user or otherwise provided as output by an application that runs in the secure enclave, or may be sent outside the secure enclave via encrypted communication and protected using checksums (e.g., hash values) provided by the secure enclave. Although the secure search results 166 include links to public web content, accessing individual links is unlikely to reveal sensitive information such as the search query, though precautions may be taken to avoid link accesses that may contain patterns from which confidential information may be deduced. For example, random time delays may be introduced between requests for links having the same host name or network domain name, or additional requests may be sent for links that are not in the search results.

To perform a search, a secure search client 138, which may be running on a client computing device, may receive a secure search query 142, e.g., as input from a user. The secure search client 138 may encrypt the secure search query 142 using an encryption key to form an encrypted search query, and send the encrypted secure search query to the secure search service 132 (arrow 144). The secure search client 138 may make the cryptographic key available to the secure search service 132 via a key management server 158, a key exchange protocol, or other suitable key distribution technique.

As an example, to provide the encryption key to the secure search service 132 for use in decrypting the encrypted search query, the secure search client 138 may send cryptographic key available to a key management server 158 (arrow 140), and the secure search service 132 may retrieve the cryptographic key from the key management server 158 (arrows 156 and 162). The cryptographic key may be, for example, an Advanced Encryption Standard ("AES") symmetric key or a key of any other suitable type. The use of a key management server to share cryptographic keys between different systems or servers is described in U.S. patent application Ser. No. 16/806,685, filed Mar. 2, 2020, which is incorporated herein by reference. In one implementation, the secure search service 132 can create a secure environment or initiate a secure search enclave 136 for a key request operation to request an encryption key for use in decrypting secure search queries received from the secure search client 138. The execution management server 148 may be located on the same node as the secure search service 132, in which case the execution management server 148 may perform local attestation to generate verification data 150 that provides a verification of the contents of the secure search enclave 136. Alternatively, the execution management server 148 may be located on a different node than the secure search service 132, in which case the execution management server may perform remote attestation to generate the verification data 150.

The secure search service 132 can provide, to the execution management server 148, attestation data associated with the key request operation. The attestation data can be associated with a hash value of an execution code of the key request operation or of the contents of the secure search enclave 136. As an example, the secure search service 132 can digitally sign the hash value of the execution code of the key request operation or the secure search enclave 136 based on an internal cryptographic key (e.g. a private cryptographic key) associated with the secure search service 132 or the secure search enclave 136. Accordingly, the attestation data can correspond to a digital signature of the secure search service 132. Further, the secure search service 132 can provide the attestation data to an execution management server 148 that has an execution management server enclave 152 (arrow 146).

The execution management server 148 can verify the attestation data. In one implementation, the execution management server 148 can verify the digital signature based on a public cryptographic key that is paired with the internal cryptographic key of the secure search service 132.

Once the execution management server 148 verifies the attestation data, the execution management server 148 issues or generates verification data 150 at the execution management server enclave 152. As an example, the execution management server 148 can issue a digital certificate for the attestation data. In one implementation, the execution management server 148 can generate the digital certificate at the execution management server enclave 152. In one implementation, the execution management server 148 can include, in the digital certificate, a digital signature signed based on an internal cryptographic key (e.g., a private cryptographic key) associated with the execution management server 148 or the execution management server enclave 152. Such digital signature can be associated with the key request operation associated with the attestation data. By issuing the verification data 150, the execution management server 148 confirms that the secure search enclave 136 has been established for use with the key request operation. The execution management server 148 may then send the verification data 150 to the secure search service 132 (arrow 154). The secure search service 132 may receive the verification data and send a request to provide an encryption key for decrypting data to the key management server 158 (arrow 156). The request may include the verification data received from the execution management server 148.

The key management server 158 may receive the request to provide an encryption key (arrow 156). The received request can include a key identifier of the encryption key. In one implementation, the request can further include verification data, which may be associated with the key request operation. Such verification data can correspond to the verification data 150 issued by the execution management server 148. That is, the verification data has been used by the secure search service 132 to verify that the secure search enclave 136 has been established to perform the key request operation. Such verification data can include identity data of the issuing authority (e.g., an identifier of the execution management server 148). In addition, the verification data can include a digital signature of the issuing authority (e.g., the execution management server 148) of the verification data.

The key management server 158 may determine whether to provide the encryption key to the secure search service 132 in view of a corresponding data policy and the verification data. The key management server 158 can perform this determination in the key management server enclave 159. In one implementation, the key management server 158 can identify a data policy that corresponds to the requested encryption key from a data store storing data policies of encryption keys. For example, the processing logic can use the key identifier included in the request to query for the appropriate data policy in the data store. For example, a data policy can describe that an encryption key is to be provided to any entity that provides verification data issued by a particular issuing authority (e.g., the execution management server 148). In such an example, the key management server 158 can identify the issuing authority from the verification data based on the identity data included in the verification data. In case the key management server 158 determines the issuing authority of the verification data satisfies the condition specified in the corresponding data policy, the key management server 158 can send the respective encryption key to the secure search service 132 (arrow 162). Otherwise, the key management server 158 can determine not to provide the encryption key and notify the secure search service 132 accordingly.

Upon receiving the encryption key 160 from the key management server 158, the secure search service 132 may use the encryption key to decrypt the encrypted secure search query 142 received from the secure search client 138 (arrow 144). The secure search service 132 may then process the decrypted secure search query 142 to generate secure search results 166. In one implementation, the secure search service may search the metadata index 134 for metadata items that match the secure search query 142. A metadata item may match a query if, for example, one or more of the search terms in the query are present in the metadata item. Query language features may be provided, such as "and" operators that cause two query terms to be required in the metadata text for a match, or an "or" operator that causes a match to occur if either of two query terms is in the metadata text. The secure search service may determine, for each index entry, whether the index entry's metadata satisfies the query. For example, if the metadata index 134 contains a first index entry having a metadata value "Description=Dog" and a second index entry having a metadata value "Description=Boat" then the second index entry satisfies a query "images of boats" because a portion of the metadata (the description) matches the query, but the first index entry does not.

Each index entry having metadata that satisfies the query may be included in a set of matching index entries 164 from which secure search results 166 may be generated. For example, a secure search result 166 may be generated for each matching index entry 164, and the link associated with each matching index entry 164 may be included in the corresponding secure search result 166. The metadata associated with each matching index entry 164 may also be included in the corresponding secure search result 166 if desired, e.g., to provide context for the link.

In addition to or as an alternative to searching the metadata, the secure search service 132 may search the content references in the metadata index 134. The content references may contain searchable information, such as image names, or may contain information that is not effectively searchable, such as abbreviated URLs. If the information in the content references is of potential interest to the searcher, then the content references may searched in addition to or alternatively to the metadata items, and any public search results that contain a content reference matching a search query may be included in the secure search results. Alternatively, the content reference value in a public index entry may be included in the public index entry's index metadata items by the metadata index generator 122, in which case the search of the metadata items may cover the content reference values.

The secure search service 132 may send the secure search results 166 to the secure search client 138 (arrow 168). Each secure search result may include one or more metadata items 170 and a content link 171 that references a content item 118. The content items may be hosted on one or more public web servers 116 or other content servers. The secure search client 138 may send a request to the public web server 116 for the content item 118 referenced by each secure search result 169 (arrow 177). The request may be, for example, a Hypertext Transport Protocol (HTTP) request message that contains a Uniform Resource Locator (URL) referencing the content item or other type of request for retrieving the content item 118 referenced by a content link 171. The public web server may respond by sending the content item 118 identified by the link to the secure search client 138. The response may be, for example, an HTTP response message.

Confidentiality of the search operations performed by the secure search service 132 is maintained because the encrypted search query 142 can only be decrypted within the secure search enclave 136, and the query processing that identifies the search results is performed within the secure search enclave 136 without being sent to a search engine or other recipient outside the secure enclave.

Figure 2A:
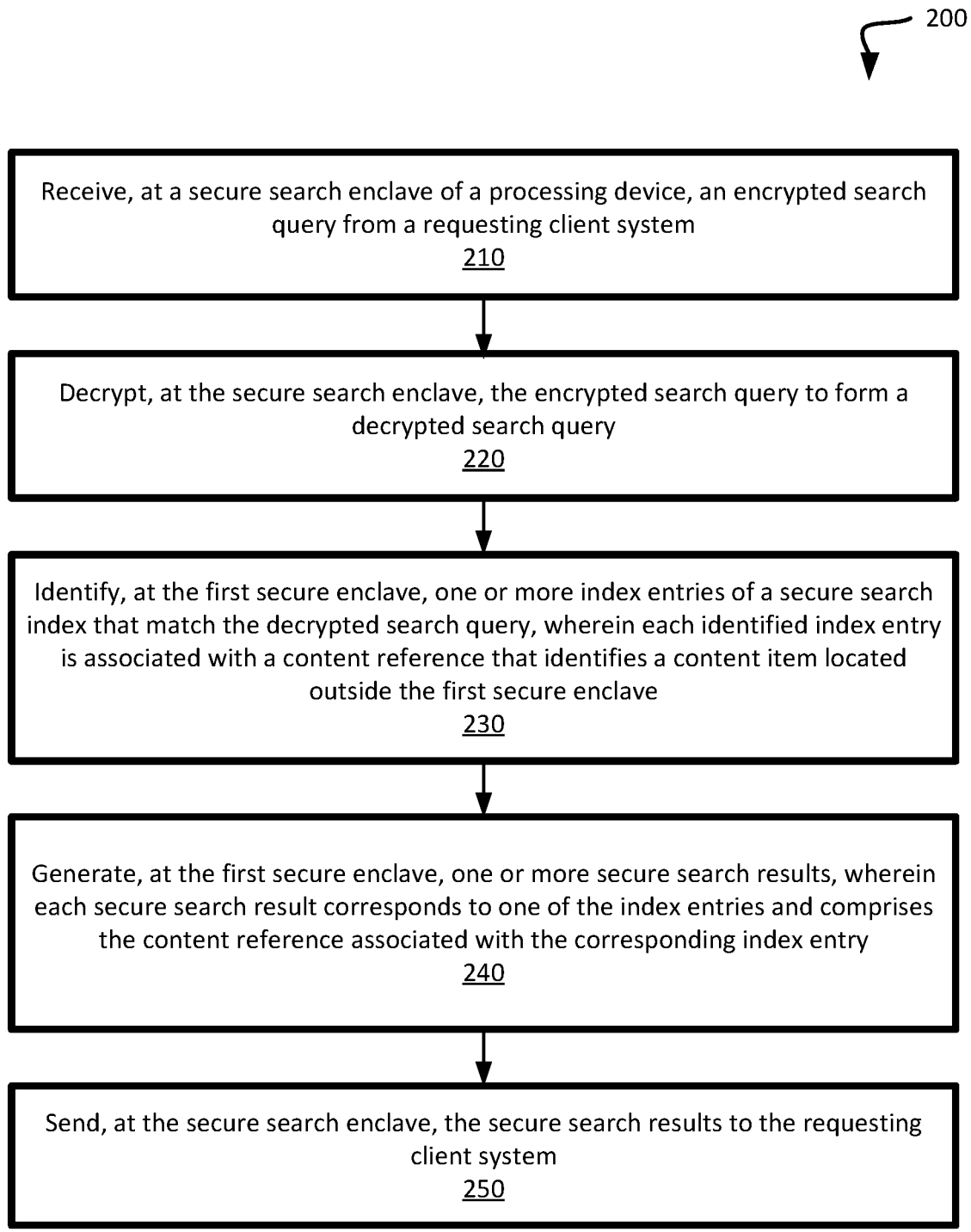
FIG. 2A is a flow diagram of an example method to perform a confidential search using a metadata index in accordance with particular embodiments of the present disclosure.

FIG. 2A is a flow diagram of an example method 200 to perform a confidential search using a metadata index in accordance with particular embodiments of the present disclosure. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 200 may be performed by the secure search service 132 of FIG. 1.

Figure 2B:
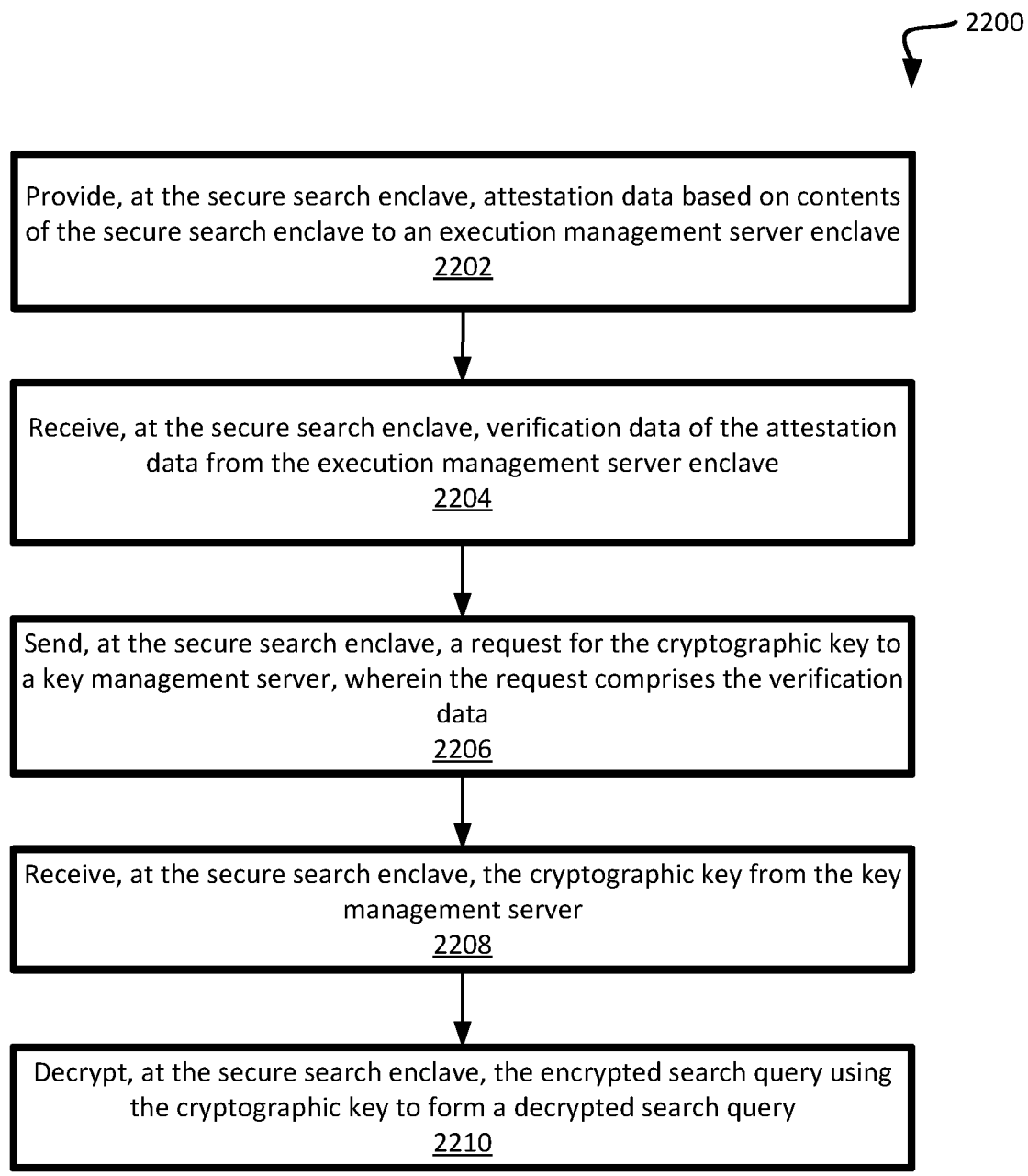
FIG. 2B is a flow diagram of an example method to retrieve a cryptographic key for decrypting a confidential search query in accordance with particular embodiments of the present disclosure.

As shown in FIG. 2A, the method 200 may begin with processing logic receiving, at a secure search enclave of a processing device, an encrypted search query from a requesting client system (block 210). The processing logic may subsequently decrypt, at the secure search enclave, the encrypted search query to form a decrypted search query (block 220). An example method to decrypt the encrypted search query is shown in FIG. 2B. The processing logic may further identify, at the secure enclave, one or more index entries of a secure search index that correspond to (e.g., match completely or partially) the decrypted search query, wherein each identified index entry is associated with a content reference that identifies a content item located outside the secure enclave (block 230). The processing logic may further generate, at the secure enclave, one or more secure search results, wherein each secure search result corresponds to one of the index entries and comprises the content reference associated with the corresponding index entry (block 240). The processing logic may further send, at the secure search enclave, the secure search results to the requesting client system (block 250).

FIG. 2B is a flow diagram of an example method 2200 to retrieve a cryptographic key for decrypting a confidential search query in accordance with particular embodiments of the present disclosure. In general, the method 2200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 2200 may be performed by the secure search service 132 of FIG. 2A, e.g., as part of performing block 220 of FIG. 2A.

As shown in FIG. 2B, the method 2200 may begin with the processing logic providing, at the secure search enclave, attestation data based on contents of the secure search enclave to an execution management server enclave (block 2202). The processing logic may subsequently receive, at the secure search enclave, verification data of the attestation data from the execution management server enclave (block 2204). The processing logic may further send, at the secure search enclave, a request for the cryptographic key to a key management server, wherein the request comprises the verification data (block 2206). The processing logic may further receive, at the secure search enclave, the cryptographic key from the key management server (block 2208). The processing logic may further decrypt, at the secure search enclave, the encrypted search query using the cryptographic key to form a decrypted search query (block 2210).

Figure 3:
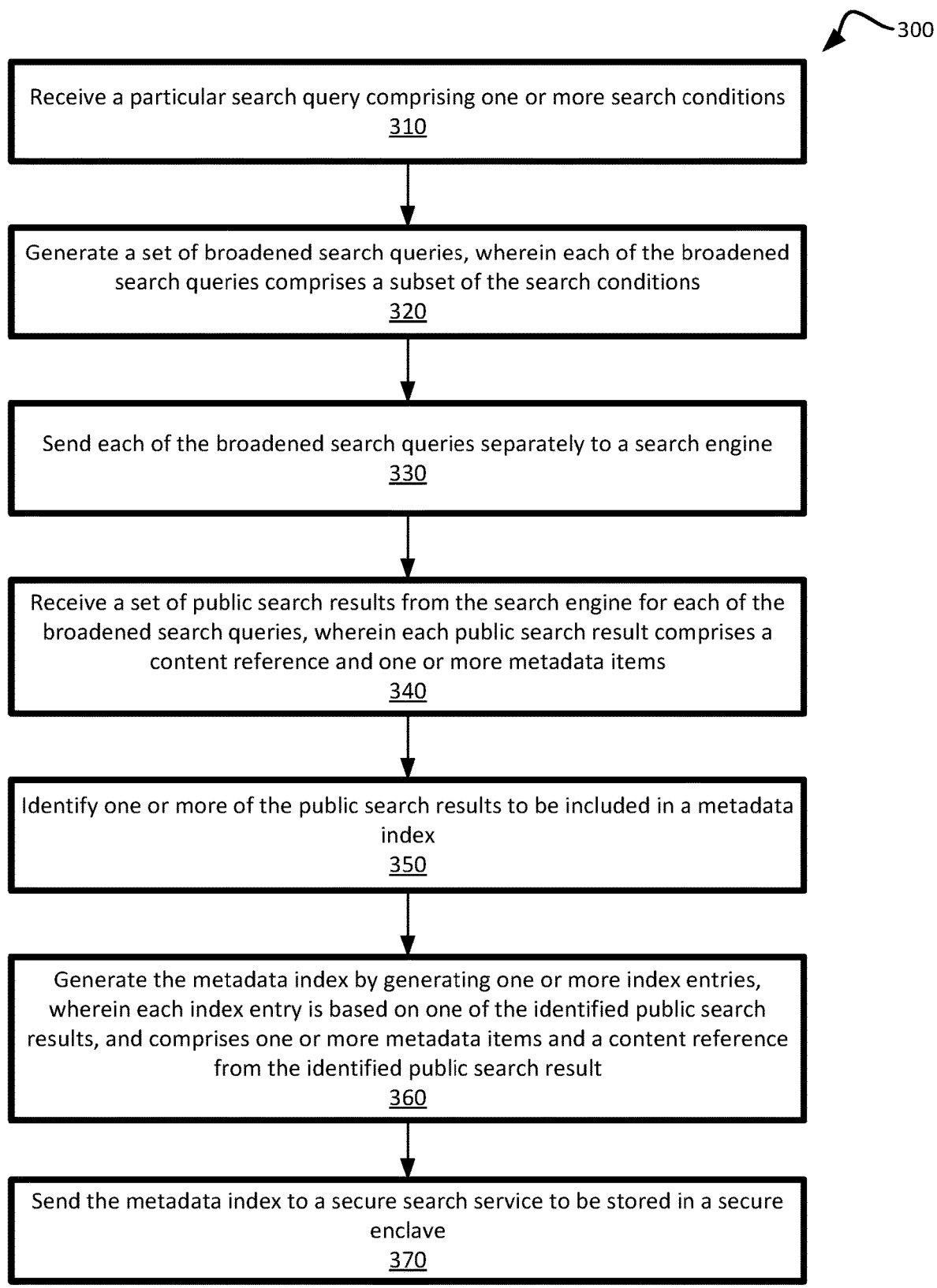
FIG. 3 is a flow diagram of an example method to generate a metadata index in accordance with particular embodiments of the present disclosure.

FIG. 3 is a flow diagram of an example method 300 to generate a metadata index in accordance with particular embodiments of the present disclosure. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 200 may be performed by the metadata index generator 122 of FIG. 1.

As shown in FIG. 3, the method 300 may begin with processing logic receiving a particular search query comprising one or more search conditions (block 310). The processing logic may subsequently generate a set of broadened search queries, wherein each of the broadened search queries comprises a subset of the search conditions (block 320). The processing logic may further send each of the broadened search queries separately to a search engine (block 330). The processing logic may further receive a set of public search results from the search engine for each of the broadened search queries, wherein each public search result comprises a content reference and one or more metadata items (block 340). The processing logic may further identify one or more of the public search results to be included in a metadata index (block 350). The processing logic may further generate the metadata index by generating one or more index entries, wherein each index entry is based on one of the identified public search results, and comprises one or more metadata items and a content reference from the identified public search result (block 360). The processing logic may further send the metadata index to a secure search service to be stored in a secure enclave (block 370).

Figure 4:
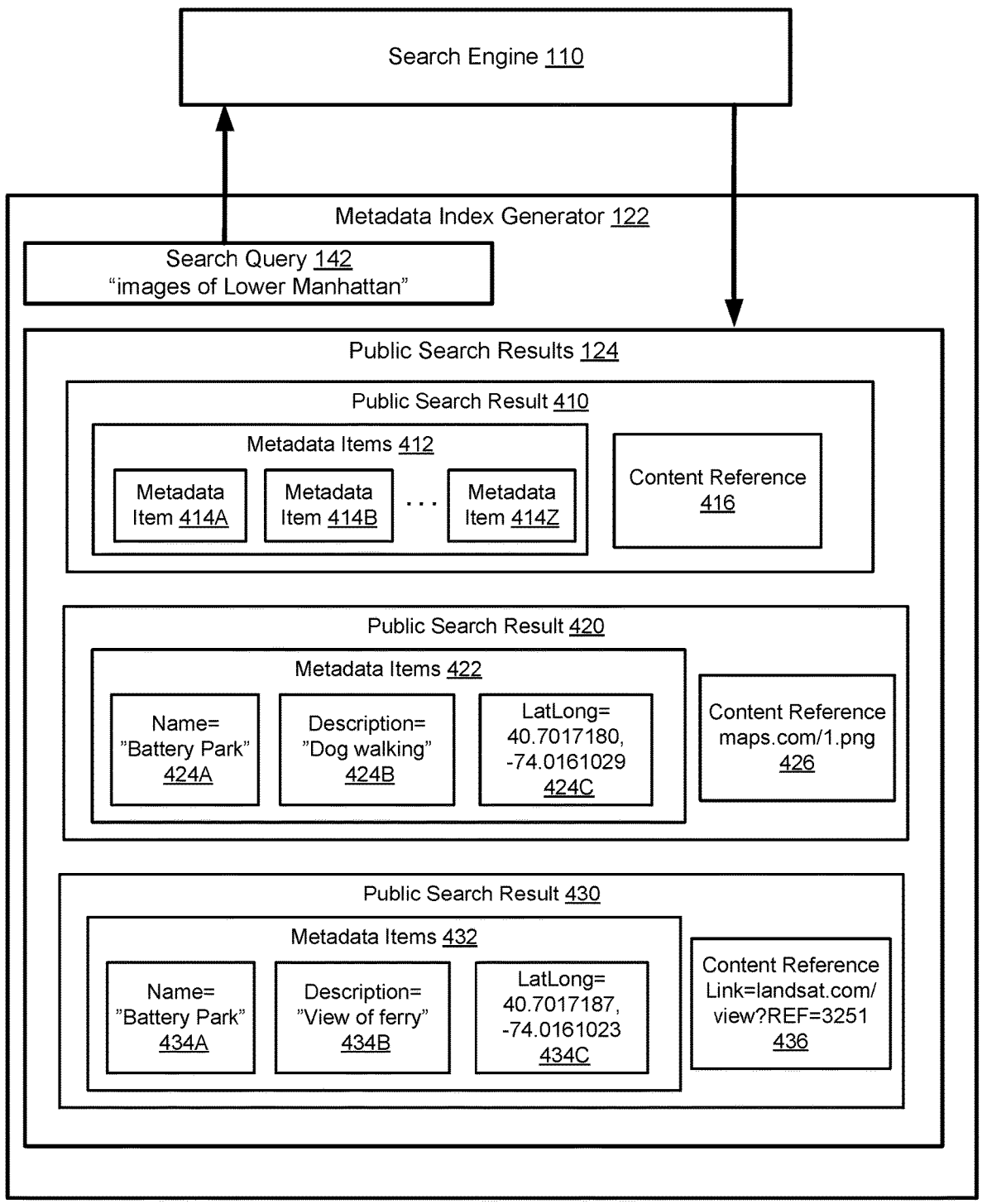
FIG. 4 illustrates an example in which public search results are produced by a metadata index generator using a public search engine based on a search query in accordance with particular embodiments of the present disclosure.

FIG. 4 illustrates an example in which public search results 124 are produced by a metadata index generator 122 using a public search engine 110 based on a search query 142 in accordance with particular embodiments of the present disclosure.

The metadata index generator 122 may generate or receive the search query 142. As an example, the search query 142 may be "images of Lower Manhattan." The metadata index generator 122 may submit the query 142 to the search engine 110, which may produce a set of public search results 124. The public search results 124 include example public search results 410, 420, and 430. A first public search result 410 include a set of metadata items 412, of which three are shown (414A, 414B, and 414Z). The first public search result 410 also includes a content reference 416, which may be a link (e.g., a URL) that refers to a content item such as a web page, image, or other media object.

A second public search result 420 include a set of metadata items 422, of which three are shown. A first metadata item 424A includes a name-value pair Name="Battery Park." A second metadata item 424B includes a name-value pair Description="Dog walking." A third metadata item 424C includes a name-value pair "LatLong=40.4017180, −74.0161029." The second public search result 420 also includes a content reference 426 having the value "maps.com/1.png."

A third public search result 430 include a set of metadata items 432, of which three are shown. A first metadata item 434A includes a name-value pair Name="Battery Park." A second metadata item 434B includes a name-value pair Description="View of ferry." A third metadata item 424C includes a name-value pair "LatLong=40.4017187, −74.0161023." The third public search result 430 also includes a content reference 436 having the value "Link=landsat.com/view?REF=3251."

Figure 5:
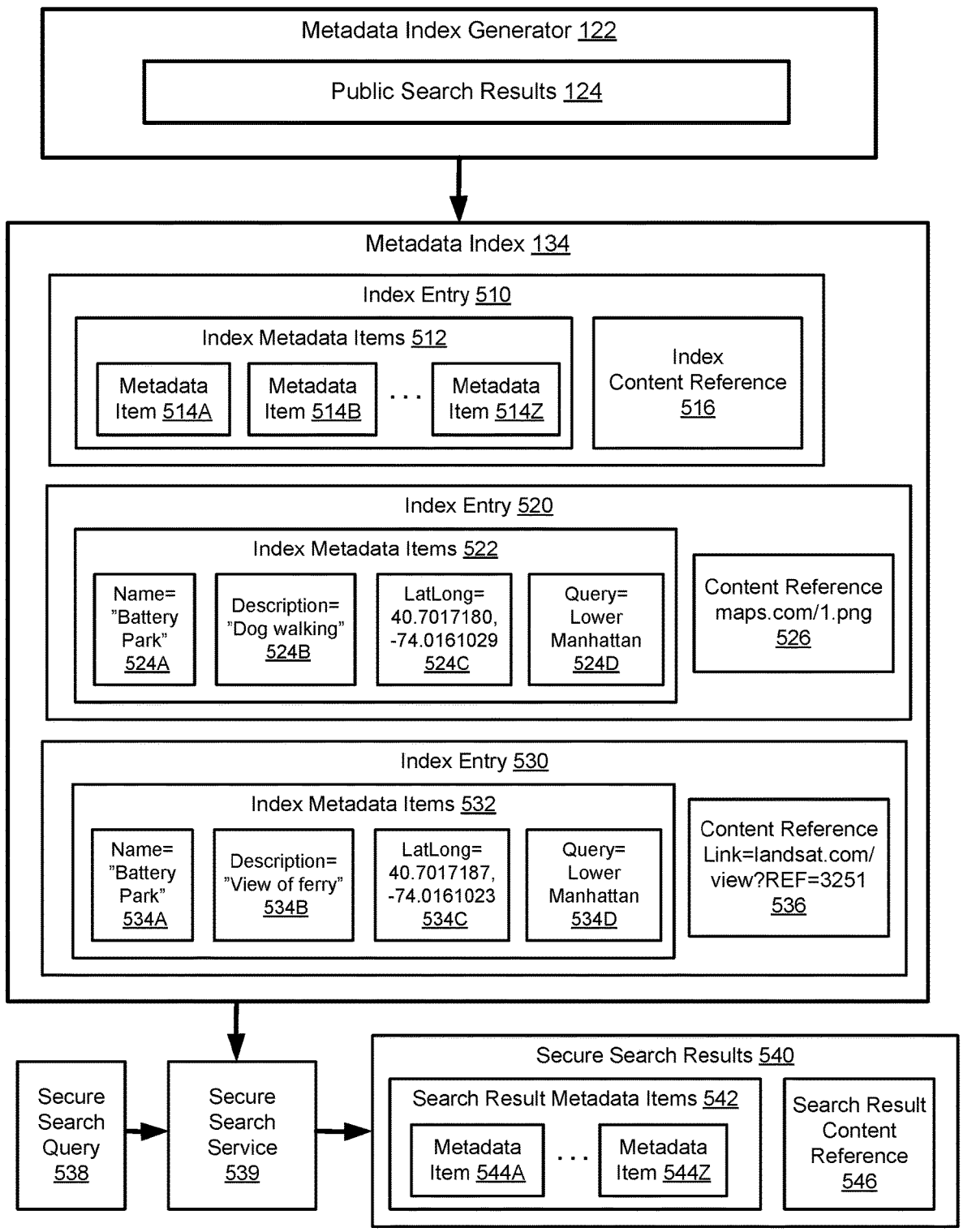
FIG. 5 illustrates an example in which secure search results are produced by a secure search service based on a metadata index and a secure search query in accordance with particular embodiments of the present disclosure.

FIG. 5 illustrates an example in which secure search results 540 are produced by a secure search service 539 based on a metadata index 134 and a secure search query 538 in accordance with particular embodiments of the present disclosure. A metadata index 134 has been generated by the metadata index generator 122 based on the public search results 124 shown in FIG. 4. The metadata index 134 includes index entries 510, 520, 530 that have been generated based on respective public search results 410, 420, 430 of the public search results 124. The index entry 510 includes a set of metadata items 512, of three of which are shown (514A, 514B, and 514Z), and an index content reference 516. The values of the index metadata items 512 may be based on (e.g., copied from or derived from) the corresponding metadata items 412 of the public search result 410. The index content reference 516 may also be based on the content reference 416.

The index entry 520 includes a set of index metadata items 522, of which four are shown. The first three, 524A, 524B, and 524C, have been copied from the respective three metadata items 424A, 424B, and 424C of the public search results 124. The fourth index metadata item, 524D, has a name-value pair "Query=Lower Manhattan" that is based on a query condition of the query 142 that generated the public search results 124 from which the fourth index metadata item 524D has been created. The index entry 520 also includes a content reference 526 having a value "maps.com/1.png" based on the value of the corresponding content reference 426 of the public search results 124 (which is also "maps.com/1.png" in this example).

The index entry 530 includes a set of index metadata items 532, of which four are shown. The first three, 534A, 534B, and 534C, have been copied from the respective three metadata items 434A, 434B, and 434C of the public search results 124. The fourth index metadata item, 534D, has a name-value pair "Query=Lower Manhattan" that is based on a query condition of the query 142 that generated the public search results 124 from which the fourth index metadata item 534D has been created. The index entry 530 also includes a content reference 536 having a value "Link=landsat.com/view?REF=3251" based on the value of the corresponding content reference 436 of the public search results 124 (which has the same value in this example).

The secure search service 530 receives a secure search query 538 and generates one or more secure search results 540 based on the metadata index 134. For example, each index entry 520 having one or more index metadata items that match the secure search query 538 may have a corresponding secure search result in the secure search results 540. Each of the secure search results 540 may include search result metadata items 542, two of which are shown (544A, 544Z). The search result metadata items 542 may be copied or derived from the index metadata items of the index entry that corresponds to the secure search results. Further, each of the secure search results 540 may include a search result content reference 546, which may be copied or derived from the content reference of the corresponding index entry.

Although only two specific public search results 420, 430 are shown in FIG. 4 and only two corresponding index entries 520, 530 are shown in FIG. 5 for the public search query "images of Lower Manhattan," a public search engine may produce millions of search results for that query. Since the public search results may be used as the basis for index entries in a metadata index, the size of the metadata index may be proportional to the number of public search results. Thus, depending on the amount of available storage space and processing capacity of the compute nodes on which the secure search service is hosted, the amount of space needed to store a metadata index for a query that produces a large number of search result may exceed the amount of available space or the processing capacity of the node cluster. To reduce the size of the metadata index, the number of public search results may be reduced by adding additional conditions (e.g., search terms) to the public search query. For example, the query "images of Lower Manhattan" may be made more specific by adding additional search terms related to topics of expected searches. If secure searches related to Battery Park in Lower Manhattan are expected, for example, the public search query may be changed to "images of Battery Park" to reduce the number of search results. The public search results for images of Battery Park may be used to generate a metadata index. Secure search queries may be performed on the metadata index using a secure search service without revealing confidential information about the searches.

For example, the search query "images of Battery Park" may be too broad to reveal any confidential information. More specific searches, such as "images of dogs walking near ferries in Battery Park," may be sensitive, however, and may be performed using the secure search service. The secure search service may perform a secure search by searching the metadata index generated based on the broad query "images of Battery Park" for the search terms "images of dogs walking near ferries in Battery Park." Any public search results from the "images of Battery Park" query may have metadata, such as descriptions or image classifications, that match one or more of the search terms "dogs walking near ferries," and the search of the metadata index performed by the secure service may identify such public search results because their metadata matches at least a portion of the search terms of the secure search query.

Public search queries such as the search query 142 may be generated based on expected future search topics. For example, the query "images of dogs walking near ferries in Battery Park" may be a sensitive search query that is expected to be used in the near future. Since the query is sensitive, it should not be submitted to the public search engine. Instead, the sensitive query may be broadened by removing query conditions (e.g., keywords). As an example, one or more of the search terms may be removed from the query. If the terms "walking" and "near ferries" are removed from the query, the broadened query may be "images of dogs in Battery Park." This query may be suitable for submission to the public search engine if, for example, the topic of dogs in Battery Park is not confidential. The public search results provided by a public search engine for this query may be used to generate a metadata index that can be stored in, or made accessible via, a secure enclave. The secure search service may process secure search queries such as "images of dogs walking near ferries in Battery Park" by search the metadata items in this index for the terms in the query "images of dogs walking near ferries in Battery Park. Alternatively, if the public search engine returns images of dogs in Battery Park as specified by the public search query, then the secure search service may omit the terms "images of dogs in battery park" from the metadata search, and instead search the metadata index for the terms that are not included in the public search query, e.g., "walking" and "near ferries."

Figure 6:
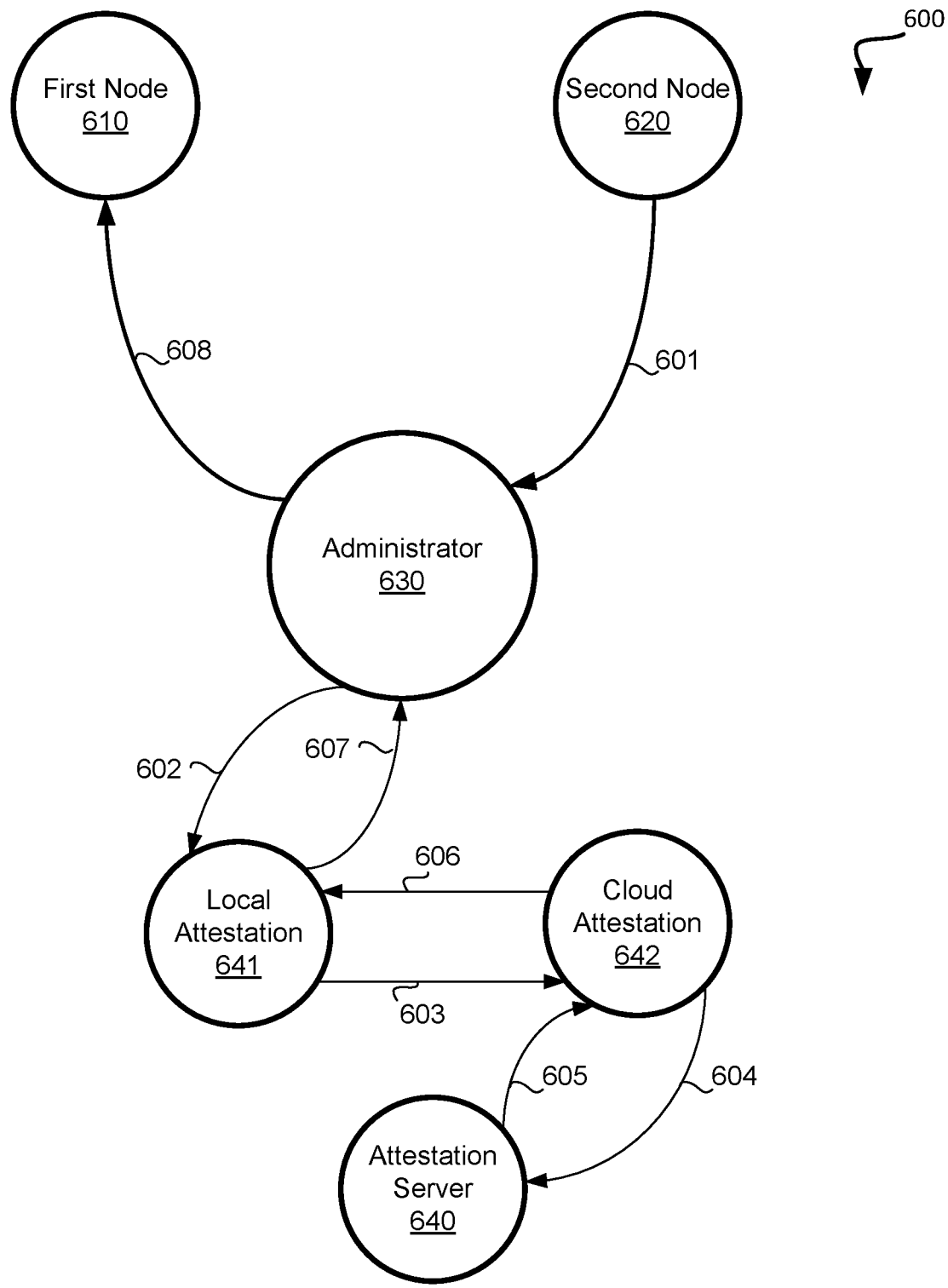
FIG. 6 illustrates an example environment to provide a master key from a first node to a second node of a secure cluster.

FIG. 6 illustrates an example environment 600 to provide a master key from a first node to a second node of a secure cluster. In general, the environment 600 may include a first node 610 and a second node 620 that may correspond to the node 110 and the node 120, respectively, of FIG. 1

As shown in FIG. 6, the environment 600 may include a first node 610 that is part of a network cluster, a second node 620 that is seeking to register with the network cluster, an administrator 630, an attestation server 640, a local attestation service 641, and a cloud attestation service 642.

In operation, the second node 620 may provide a message 601 to the administrator 630. For example, the message 601 may include attestation data that is signed or based on a public key of the second node 620. The attestation data may be based on one or more factors including, but not limited to, attestation data that is generated by a processor on the second node 620, an attestation that is generated by another application that is provided by the processor providing the second node 620 (e.g., another application in a secure enclave that is provided by the same processor that is providing the second node 620), or a software state associated with the second node 620. For example, the attestation data may be based on a cryptographic key of another application provided on the second node 620 which is subsequently combined with a function of the processor providing the second node 620 to generate the attestation data.

The administrator 630 may receive the message 601 and may transmit the message 601 as a message 602 to the local attestation service 641. In particular embodiments, the local attestation service 641 may be another application that is assigned to a secure enclave provided by a processor (e.g., an application 740A to 740Z of FIG. 7 that has been assigned to a secure enclave). The local attestation service 641 may verify the attestation data from the message 602. For example, another cryptographic key of the local attestation service 641 may be used to verify the attestation data. The local attestation service 641 may then provide a message 603 to a cloud attestation service 642 which may also verify the attestation data and/or provide another message 604 to the attestation server 640. The cloud attestation service 642 may be another server that is associated with the self-encrypting key management system that corresponds to the node 610. The attestation server 640 may then transmit a message 605 to cloud attestation service 642 (or the local attestation service 641 if the cloud attestation service 642 is not used). The message 605 may indicate whether the attestation data received by the attestation server 640 was generated and provided by a processor provided or manufactured by an entity associated with the attestation server 640. Subsequently, the local attestation service 641 may receive a message 606 from the cloud attestation service 642 that includes the indication from the attestation server 640. The local attestation service may then provide a message 607 back to the administrator 630 that indicates that the attestation of the second node 620 was successful or was not successful.

In particular embodiments, a certificate authority may provide a digital certificate to the first node 610 and the second node 620. For example, the digital certificate may include a public key and an entity (e.g., a particular node) that is assigned to the public key. The certificate authority may provide a digital certificate to the first node 610 that includes the public key of the second node 620 so that the first node 610 may authenticate a subsequent message signed by the corresponding private key of the second node 620. In particular embodiments, the certificate authority may provide the digital certificate to the second node 620 to authenticate and register with the first node 610.

Figure 7:
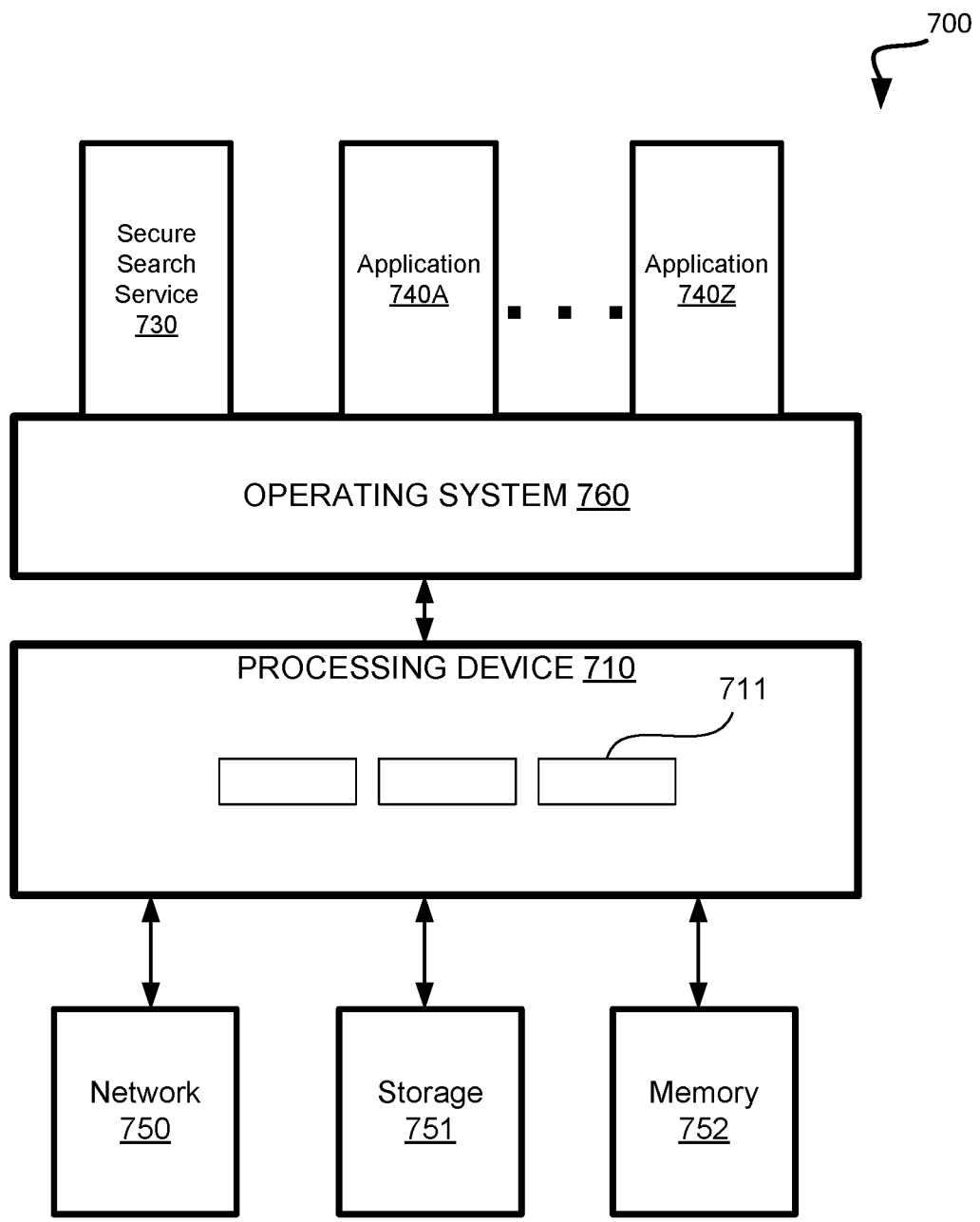
FIG. 7 illustrates an example network server with a secure search service to perform confidential searches in accordance with particular embodiments of the present disclosure.

FIG. 7 illustrates an example network server 700 with a secure search service to perform confidential searches in accordance with particular embodiments of the present disclosure. In general, a secure search service 730 may be hosted by a network server to provide confidential searches of public content for one or more other applications 740A to 740Z that are also hosted by the network server or another network server. The secure search service 730 may correspond to a node 122 or 132 of FIG. 1.

As shown in FIG. 7, the network server 700 may include a processing device 710 that may execute an operating system 720. Furthermore, the processing device 710 may include one or more internal cryptographic keys 711 that may be used to encrypt and decrypt data stored in a portion of a memory that is assigned to a secure enclave of the secure search service 730. The access to the data of the secure search service 730 in the secure enclave (e.g., data stored at a storage resource) may be protected from the one or more applications 740A to 740Z and the operating system 720. For example, the access to the data of the secure enclave corresponding to the secure search service 730 may be protected by the use of one of the internal cryptographic keys 711 that are internal to the processing device 710 so that the access to the data is based on a hardware access as opposed to a software access. The operating system 720 may be associated with a first privilege level and the secure search service 730 and the applications 740A to 740Z may be associated with a second privilege level where the first privilege level of the operating system is more privileged than the second privilege level of the various applications that are run on the operating system 720 (e.g., the more privileged level allows access to more resources of the network server than the less privileged level). Thus, the operating system 720 may be allowed access to resources of the applications 740A to 740Z. However, since the secure search service 730 is assigned to a secure enclave where access to the data of the secure enclave is based on the use of an internal cryptographic key 711 of the processing device 711, the operating system 720 may not be able to access the data of the secure search service 730 despite having a more privileged level of access than the secure search service 730. The master key that is used to decrypt data at the storage resource may be an internal cryptographic key 711.

Figure 8:
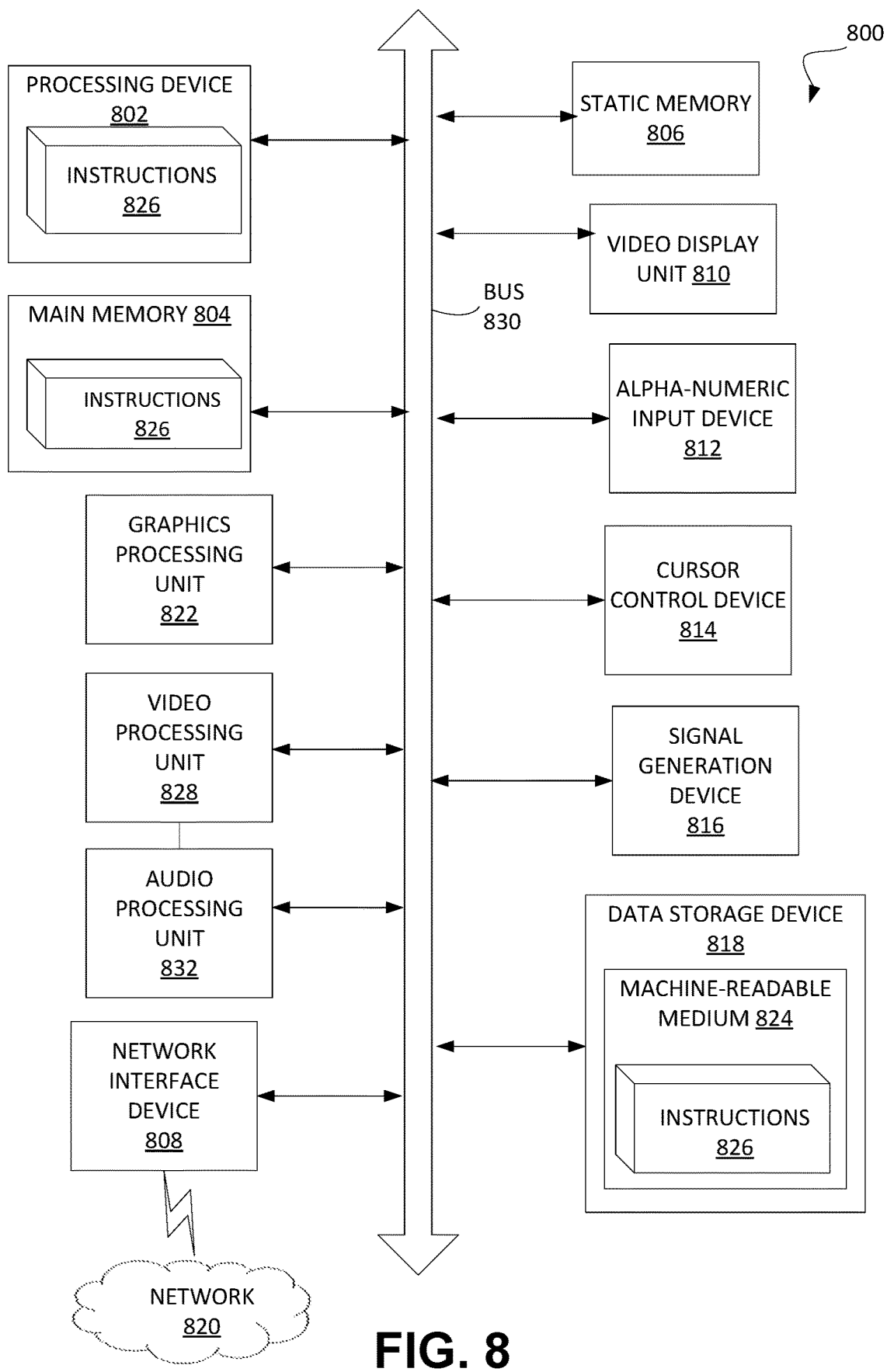
FIG. 8 illustrates an example computer system in which embodiments of the present disclosure operate.

FIG. 8 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In one implementation, the instructions 826 include instructions to implement functionality as described herein. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing certain terms may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising: receiving, at a secure enclave of a processing device, an encrypted search query from a requesting client system; decrypting, at the secure enclave, the encrypted search query to form a decrypted search query; identifying, at the secure enclave, one or more index entries of a metadata index that correspond to the decrypted search query, wherein each identified index entry is associated with a content reference that identifies a content item located outside the secure enclave; generating, at the secure enclave, one or more secure search results, wherein each secure search result corresponds to one of the index entries and comprises the content reference associated with the corresponding index entry; and sending, at the secure enclave, the secure search results to the requesting client system, wherein the identifying one or more index entries that correspond to the decrypted search query comprises: identifying one or more index entries, each index entry having at least one associated index metadata item that corresponds to the decrypted search query.

2. The method of claim 1, wherein the at least one index metadata item corresponds to the decrypted search query when a value of the at least one index metadata item satisfies a query condition specified by the decrypted search query.

3. The method of claim 1, wherein each secure search result comprises at least one search result metadata item based on the at least one index metadata item associated with the index entry that corresponds to the secure search result.

4. The method of claim 1, wherein each secure search result comprises one or more search result metadata items based on text of a query used to generate the metadata index.

5. The method of claim 1, wherein each index metadata item comprises one or more of a text string or coordinates of a geographic location.

6. The method of claim 1, wherein each index metadata item comprises one or more of a name or a description.

7. The method of claim 1, wherein the decrypting, at the secure enclave, the encrypted search query comprises: receiving, at the secure enclave, a cryptographic key via a secure protocol; and decrypting the encrypted search query using the cryptographic key.

8. The method of claim 7, wherein the receiving, at the secure enclave, the cryptographic key via the secure protocol comprises: providing attestation data based on contents of the secure enclave to another enclave; receiving verification data of the attestation data from another enclave; sending a request for the cryptographic key to a key management server, wherein the request comprises the verification data; and receiving the cryptographic key from the key management server.

9. The method of claim 7, wherein the secure protocol comprises a transport layer security protocol that encrypts network communication using a secret key.

10. The method of claim 1, wherein at least a portion of the metadata index is stored in the secure enclave.

11. The method of claim 10, further comprising: receiving a particular search query comprising one or more search conditions; generating a set of broadened search queries, wherein each of the broadened search queries comprises a subset of the search conditions; sending each of the broadened search queries separately to a search engine; receiving a set of public search results from the search engine for each of the broadened search queries, wherein each public search result comprises a content reference and one or more metadata items; identifying one or more of the received public search results to be included in the metadata index; generating the metadata index by generating the index entries, wherein each index entry is based on one of the identified public search results, and comprises one or more metadata items and a content reference from the identified public search results; and storing the metadata index in the secure enclave.

12. The method of claim 11, wherein the set of secure search results is a subset of the set of public search results.

13. A system comprising: a memory; and a processing device, operatively coupled with the memory, to: receive, at a secure enclave of the processing device, an encrypted search query from a requesting client system; decrypt, at the secure enclave, the encrypted search query to form a decrypted search query; identify, at the secure enclave, one or more index entries of a metadata index that correspond to the decrypted search query, wherein each identified index entry is associated with a content reference that identifies a content item located outside the secure enclave; generate, at the secure enclave, one or more secure search results, wherein each secure search result corresponds to one of the index entries and comprises the content reference associated with the corresponding index entry; and send, at the secure enclave, the secure search results to the requesting client system, wherein to identify one or more index entries that correspond to the decrypted search query, the processing device is further to: identify one or more index entries, each index entry having at least one associated index metadata item that corresponds to the decrypted search query.

14. The system of claim 13, wherein the at least one index metadata item corresponds to the decrypted search query when a value of the at least one index metadata item satisfies a query condition specified by the decrypted search query.

15. The system of claim 13, wherein each secure search result comprises at least one search result metadata item based on the at least one index metadata item associated with the index entry that corresponds to the secure search result.

16. A non-transitory computer readable medium comprising data that, when accessed by a processing device, cause the processing device to perform operations comprising: receiving, at a secure enclave of the processing device, an encrypted search query from a requesting client system; decrypting, at the secure enclave, the encrypted search query to form a decrypted search query; identifying, at the secure enclave, one or more index entries of a metadata index that correspond to the decrypted search query, wherein each identified index entry is associated with a content reference that identifies a content item located outside the secure enclave; generating, at the secure enclave, one or more secure search results, wherein each secure search result corresponds to one of the index entries and comprises the content reference associated with the corresponding index entry; and sending, at the secure enclave, the secure search results to the requesting client system, wherein to identify one or more index entries that correspond to the decrypted search query, the operations further comprise: identifying one or more index entries, each index entry having at least one associated index metadata item that corresponds to the decrypted search query.

17. The non-transitory computer readable medium of claim 16, wherein the at least one index metadata item corresponds to the decrypted search query when a value of the at least one index metadata item satisfies a query condition specified by the decrypted search query.

\* \* \* \* \*